(12) United States Patent
Miller et al.

(10) Patent No.: US 12,046,947 B2
(45) Date of Patent: Jul. 23, 2024

(54) STANDBY BATTERY-METER SOCKET ADAPTER

(71) Applicant: Briggs & Stratton, LLC, Wauwatosa, WI (US)

(72) Inventors: Michael Miller, Lake Mills, WI (US); Kyle Perea, Slinger, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 58 days.

(21) Appl. No.: 17/675,034

(22) Filed: Feb. 18, 2022

(65) Prior Publication Data
US 2022/0173603 A1 Jun. 2, 2022

Related U.S. Application Data

(63) Continuation-in-part of application No. 16/686,352, filed on Nov. 18, 2019, now abandoned.

(60) Provisional application No. 62/769,106, filed on Nov. 19, 2018.

(51) Int. Cl.
| | |
|---|---|
| *H02J 9/06* | (2006.01) |
| *H02J 7/00* | (2006.01) |
| *G06Q 50/06* | (2012.01) |
| *H02J 3/38* | (2006.01) |

(52) U.S. Cl.
CPC ............ *H02J 9/062* (2013.01); *H02J 7/0068* (2013.01); *G06Q 50/06* (2013.01); *H02J 3/381* (2013.01)

(58) Field of Classification Search
None
See application file for complete search history.

(56) References Cited

U.S. PATENT DOCUMENTS

| | | |
|---|---|---|
| 3,643,209 A | 2/1972 | Coston |
| 3,654,484 A | 4/1972 | Jorgenson et al. |
| 4,258,968 A | 3/1981 | Holt |
| 5,268,850 A | 12/1993 | Skoglund |
| 5,790,369 A | 8/1998 | Sitler |
| 6,074,246 A | 6/2000 | Seefeldt et al. |
| 6,107,701 A | 8/2000 | Flegel |
| 6,163,449 A | 12/2000 | Flegel |
| 6,172,432 B1 | 1/2001 | Schnackenberg et al. |

(Continued)

FOREIGN PATENT DOCUMENTS

CN 112994222 A * 6/2021 ............. H02J 9/062

OTHER PUBLICATIONS

DTE Energy advanced implementation of energy storage technologies; Jan. 31, 2017, DTE Energy (302 Pages).

*Primary Examiner* — Rexford N Barnie
*Assistant Examiner* — David A Shiao
(74) *Attorney, Agent, or Firm* — Foley & Lardner LLP

(57) ABSTRACT

An electrical system operable to supply power from at least one of a primary power source or a standby power source to one or more electrical loads. The electrical system is configured to be provided between an electricity meter and a meter socket. The electrical system includes a housing, a plurality of contacts configured to be coupled with the meter, the meter socket, and a transfer switch. The transfer switch includes a first switch configured to selectively connect the primary power source to the one or more electrical loads, a second switch configured to selectively connect the standby power source to the one or more electrical loads, and an electrical control logic.

14 Claims, 16 Drawing Sheets

(56) References Cited

U.S. PATENT DOCUMENTS

| | | |
|---|---|---|
| 6,188,145 B1 | 2/2001 | Stewart |
| 6,365,990 B2 | 4/2002 | Flegel |
| 6,376,937 B1 | 4/2002 | Stewart |
| 6,414,240 B1 | 7/2002 | Flegel |
| 6,420,801 B1 | 7/2002 | Seefeldt |
| 6,545,374 B1 | 4/2003 | Allenbach |
| 6,784,385 B2 | 8/2004 | Hernandez-Perez |
| 6,956,733 B2 | 10/2005 | Beasley et al. |
| 7,019,666 B2 | 3/2006 | Tootoonian Mashhad et al. |
| 7,030,514 B2 | 4/2006 | Wareham et al. |
| 7,397,652 B2 | 7/2008 | Price et al. |
| 7,683,603 B1 | 3/2010 | Lathrop et al. |
| 8,288,890 B2 | 10/2012 | Young |
| 8,292,658 B2 | 10/2012 | Sullivan et al. |
| 8,368,386 B2 | 2/2013 | Reineccius |
| 8,415,830 B2 | 4/2013 | Lim et al. |
| 9,620,305 B2 | 4/2017 | Miller et al. |
| 10,038,310 B2 | 7/2018 | Miller et al. |
| 10,193,381 B2 | 1/2019 | Czarnecki |
| 10,879,727 B1 | 12/2020 | Cooper |
| 2002/0117900 A1* | 8/2002 | Perttu .................. H02J 9/06 307/64 |
| 2002/0171436 A1 | 11/2002 | Russell |
| 2003/0034693 A1 | 2/2003 | Wareham et al. |
| 2003/0075982 A1 | 4/2003 | Seefeldt |
| 2004/0036362 A1 | 2/2004 | Beck et al. |
| 2005/0116814 A1 | 6/2005 | Rodgers et al. |
| 2005/0278075 A1* | 12/2005 | Rasmussen ............... H02J 9/06 700/286 |
| 2006/0138868 A1 | 6/2006 | Wareham et al. |
| 2008/0061629 A1 | 3/2008 | Plahn |
| 2009/0150100 A1 | 6/2009 | Pifer et al. |
| 2010/0181177 A1 | 7/2010 | Young |
| 2010/0207448 A1 | 8/2010 | Cooper et al. |
| 2010/0225305 A1 | 9/2010 | Reineccius |
| 2011/0004357 A1 | 1/2011 | Mathiowetz |
| 2011/0175453 A1 | 7/2011 | Batzler et al. |
| 2012/0074794 A1 | 3/2012 | Morales et al. |
| 2013/0106397 A1 | 5/2013 | Fulton et al. |
| 2014/0042809 A1 | 2/2014 | Lim et al. |
| 2014/0077821 A1 | 3/2014 | Reed et al. |
| 2014/0088780 A1 | 3/2014 | Chen |
| 2014/0203648 A1* | 7/2014 | Siglock .................. H02J 9/061 307/64 |
| 2015/0036267 A1 | 2/2015 | Miller et al. |
| 2015/0207316 A1 | 7/2015 | Saussele et al. |
| 2015/0270743 A1 | 9/2015 | Orthlieb et al. |
| 2016/0034011 A1 | 2/2016 | Tuleja |
| 2016/0056688 A1 | 2/2016 | Cooksey et al. |
| 2016/0156197 A1 | 6/2016 | Batzler et al. |
| 2016/0344190 A1* | 11/2016 | Reineccius ............... H02J 3/388 |
| 2017/0373527 A1* | 12/2017 | Thurk ....................... H02J 9/06 |
| 2018/0248379 A1 | 8/2018 | Schulz et al. |
| 2019/0020218 A1 | 1/2019 | Okada et al. |
| 2019/0067990 A1* | 2/2019 | Hermans ................. H05B 47/17 |
| 2019/0081458 A1* | 3/2019 | Lapushner ............. H01R 33/94 |
| 2021/0135489 A1 | 5/2021 | Stites-Clayton et al. |
| 2021/0203165 A1 | 7/2021 | Erokhovets |

\* cited by examiner

STANDBY BATTERY-METER SOCKET ADAPTER

CROSS-REFERENCE TO RELATED APPLICATIONS

This application is a continuation-in-part of U.S. application Ser. No. 16/686,352, filed Nov. 18, 2019 which claims the benefit of and priority to U.S. Application No. 62/769,106, filed Nov. 19, 2018, both of which are incorporated herein by reference in their entireties.

BACKGROUND

The present disclosure generally relates to the field of building electrical systems and more specifically to building electrical systems including utility power sources and a standby power source. Secondary power systems are generally configured to provide backup power to electrical loads in the event of a utility power failure. The transfer between the utility power source and the standby power source is facilitated by an automatic transfer switch.

Presently, the transfer of the power supply from the utility source to the standby power source is carried out by a transfer switch that is positioned in a location between an existing utility meter housing and a distribution panel. The existing utility meter housing includes a meter socket that receives an electricity meter for measuring the amount of electricity consumed by the home or business. In typical installations, the transfer switch is mounted at or near either the utility meter housing or at or near the distribution panel. The installation of the transfer switch is a complicated process, often including isolation of the ground wires from the neutral wires within the distribution panel (breaker box), and relocation of the neutral-ground bonding point. Electrical codes require that all neutrals in a house or building electrical system be bonded to ground at the closest point to the service entrance disconnect. Accordingly, when installing a transfer switch into an existing house between the utility meter housing and the distribution panel, an electrician will have to isolate the ground wires and neutral wires in the electrical distribution panel to their individual terminal strips and connect them to the corresponding ground and neutral terminals within the transfer switch panel. Once complete, the electrician will then be required to relocate the neutral-ground bonding point from its previous location (within the distribution panel) to the transfer switch panel as this is now the closest panel to the service entrance disconnect. This can be a time consuming process. The time required to install a transfer switch between the utility meter housing and the distribution panel can be between 2 and 4 hours and requires trained electricians, which can be costly for the home or business owner.

In the building electrical system described above that includes a standby power source, the standby power source is often a standby generator that includes an internal combustion engine powered by a fuel source, such as natural gas or propane. The fuel source is provided from a fuel storage location or tank or from a utility source. Such standby power sources that utilize a standby generator require connections to the fuel source, which increases the time and cost for installation.

The system of the present disclosure solves the above-identified problems present at installation while providing a standby power source for powering electrical systems within a home or building. The system of the present disclosure addresses the desire to provide a standby power source while eliminating the cost and complexity of installation.

SUMMARY

One embodiment of the present disclosure includes an electrical system operable to supply power from at least one of a primary power source or a standby power source to one or more electrical loads. The electrical system is configured to be provided between an electricity meter and a meter socket. The electrical system includes a housing, a plurality of contacts configured to be coupled with the meter, the meter socket, and a transfer switch. The transfer switch includes a first switch configured to selectively connect the primary power source to the one or more electrical loads, a second switch configured to selectively connect the standby power source to the one or more electrical loads, and an electrical control logic.

Another exemplary embodiment of the present disclosure includes an electrical system operable to supply power from at least one of a first power source, a second power source, or a third power source to one or more electrical loads. The electrical system is configured to be provided between an electricity meter and a meter socket. The electrical system includes a housing, a plurality of contacts configured to be coupled with the meter, the meter socket, and a transfer switch. The transfer switch includes a first switch configured to selectively connect the first power source to the one or more electrical loads, a second switch configured to selectively connect the second power source to the one or more electrical loads, a third switch configured to selectively connect the third power source to the one or more electrical loads, and an electrical control logic.

Still another exemplary embodiment of the present disclosure includes a meter socket adapter configured to allow switching between a utility power supply and a secondary power supply to provide power to an electrical load. The meter socket adapter is configured to be mounted between an electricity meter and a meter housing. The meter socket adapter includes a transfer switch for selectively coupling the utility power supply or the secondary power supply to the electrical load and a load management controller comprising a transfer switch logic circuit.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
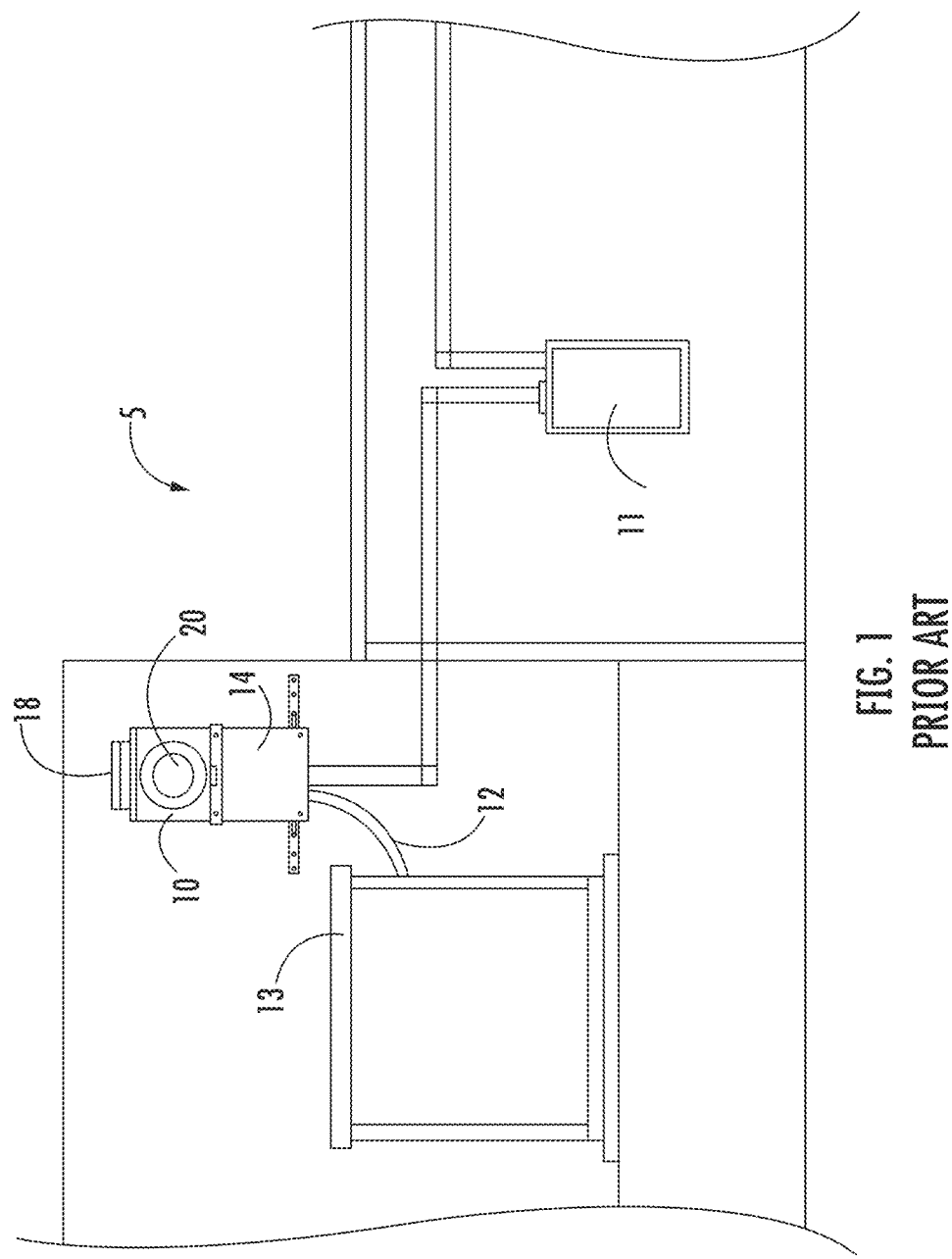
FIG. 1 is a perspective view illustrating the mounting of the transfer switch with a meter socket adapter to an existing utility meter socket between a standby generator and a distribution panel.

FIG. 1 illustrates a prior art electrical system 5 for a building (e.g., a home electrical system). Electrical system 5 includes an electric meter housing 18 that encloses a contact block that is electrically coupled to an off-site utility power source (not shown) and configured to provide power from the off-site utility source through an electricity meter 20 to a distribution panel 11. Distribution panel 11 (e.g., a circuit breaker box, a fuse box, etc.) is configured to route electrical power to electrical loads (not specifically shown in FIG. 1) in the building. Electrical system 5 also includes a standby generator 13 connected to a fuel source for providing electrical power to distribution panel 11 instead of (or potentially in addition to) the utility power provided through the meter housing 18. For example, the standby generator 13 may be configured to provide power to distribution panel 11 through a transfer switch in the event of a utility power failure.

The electrical system 5 includes a meter socket adapter 10 that is positioned between the meter housing 18 and the distribution panel 11. The meter socket adapter 10 is shown and described in U.S. Pat. No. 9,620,305 and is available from Briggs & Stratton Corporation under the Direct Power™ name. The adapter 10 includes an internal transfer switch controller and contacts to control the supply of power to the electric loads from either the utility or generator 13. The meter socket adapter 10 is hard wired to the standby generator 13 through a cable 12. The cable 12 can be a 25-foot, 50-foot or any other desired length cable that connects to the standby generator 13 or disconnect box in a known manner. The cable 12 enters into the outer housing 14 to provide power to a set of internal contacts that allows the transfer switch components of the meter socket adapter 10 to switch to power from the generator 13 when the utility-side power is interrupted. The outer housing 14 is preferably made of metal, such as steel or aluminum. However, other materials, such as a durable composite, are contemplated as being a viable alternative.

Figure 2:
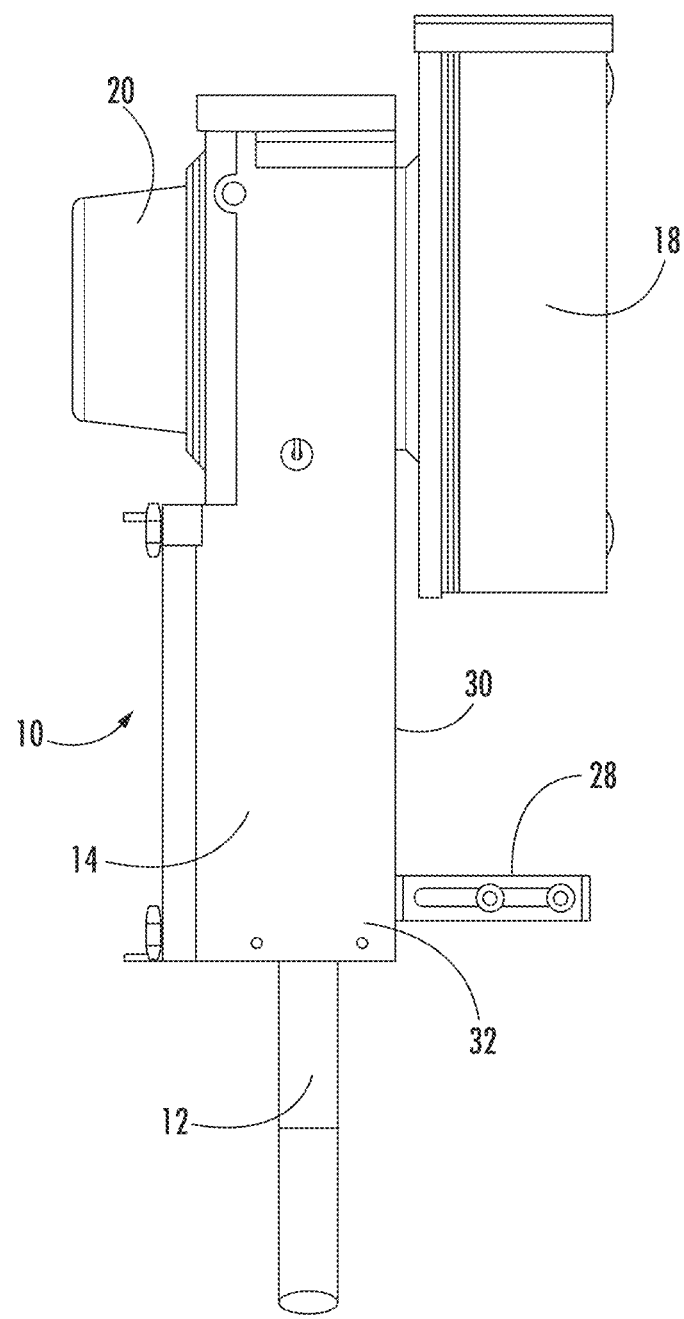
FIG. 2 is a side view showing the mounting of the meter socket adapter to the utility meter socket.

As can be seen in FIG. 2, the meter socket adapter 10 is plugged into a meter socket formed as part of the conventional meter housing 18. The meter housing 18 is conventionally mounted on the exterior of a home or on the interior of a building. The meter housing 18 typically receives an existing electricity meter 20 through the interaction between contact blades on the back surface of the electricity meter 20 and receiving jaws formed within the meter socket. The meter socket adapter 10 of the present disclosure is positioned between the meter housing 18 and the electricity meter 20.

In addition to the transfer switch controller, the meter socket adapter 10 may also include load management controls contained inside the outer housing 14. The load management controls communicate to load relays that are located in series with electric loads at the home or business. Wired or wireless communications can be used to activate the load relays to provide load shedding capabilities.

The load management controller contained within the outer housing 14 functions to selectively shed loads from the power distribution system and subsequently reconnect the loads to the power distribution system depending upon the amount of power drawn by the loads and the power available from the standby power source. The details of the load management control board can vary depending upon the particular power distribution system. The details of one exemplary load management controller and its method of operation are set forth in U.S. Pat. No. 8,415,830, the disclosure of which is incorporated herein by reference. However, other types of load management systems and methods of operation are contemplated as being within the scope of the present disclosure. The load management controller is contained within the housing such that both the transfer switch and the load management components required to selectively shed/reconnect loads within the home serviced by the generator can be installed as a single device contained within the housing.

Figure 3:
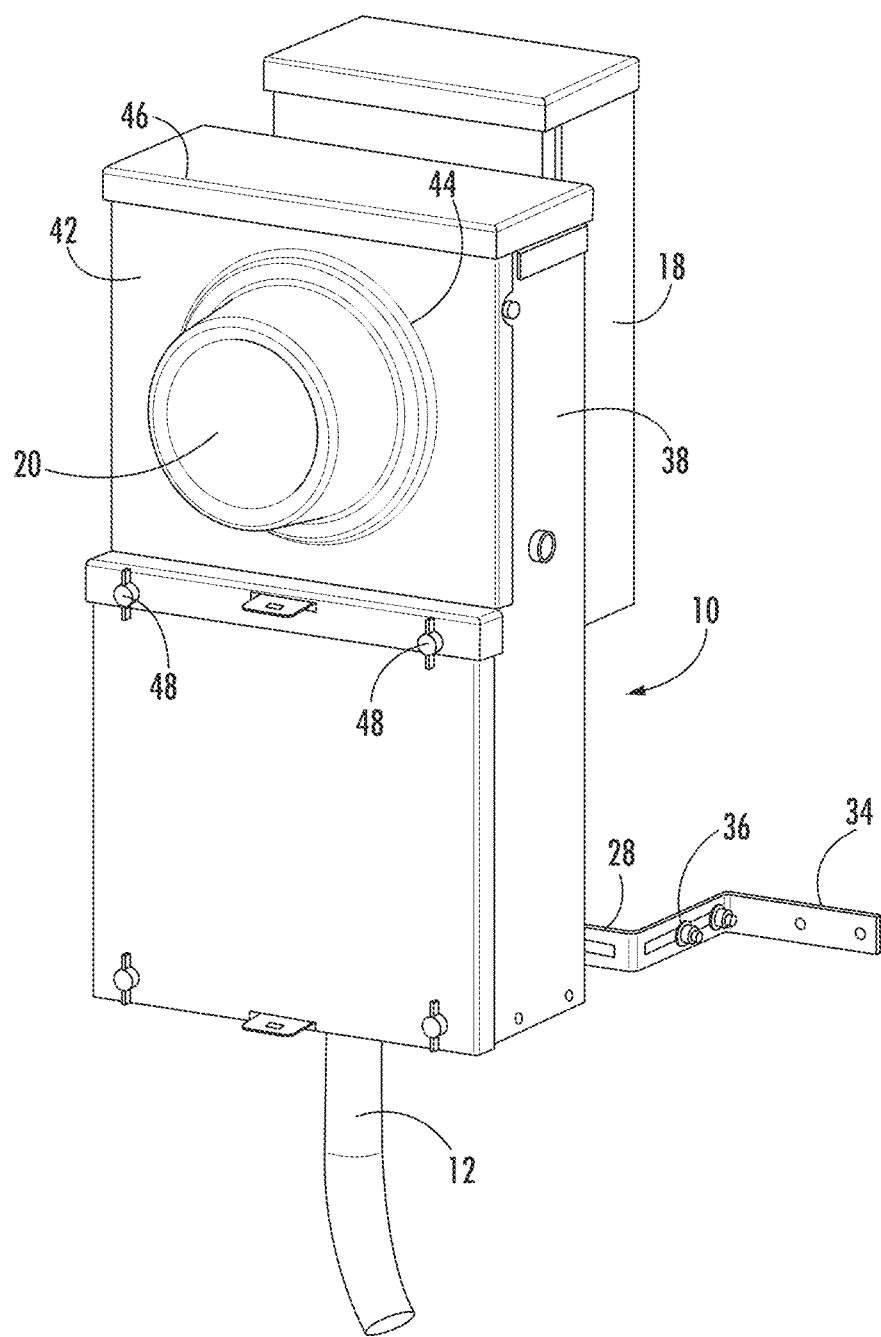
FIG. 3 is a perspective view of the meter socket adapter.

FIG. 3 illustrates the meter socket adapter 10 securely mounted to the utility meter housing 18. Typically, the utility meter housing 18 will be mounted to a wall of a building or home. The utility meter housing 18 can be mounted to either an exterior wall of a building or, in some instances, can be mounted inside a building. As discussed previously, the utility meter housing 18 typically receives the electricity meter 20. However, when the meter socket adapter 10 is utilized, the electricity meter 20 is received within the meter socket adapter 10 while the meter socket adapter 10 is received within the meter socket of the meter housing 18. A support bracket 28 is attached to a back surface 30 of the outer housing 14. Although not required, the support bracket 28 is typically attached to the same wall that supports the meter housing 18. The support bracket 28 provides support for the bottom end 32 of the meter socket adapter 10. The support bracket 28 includes a pair of extending horizontal mounting portions 34 that can be securely attached to a wall surface. A pair of adjustment bolts allow the depth of the support bracket 28 to be adjusted depending upon the thickness of the meter housing 18.

Figure 4:
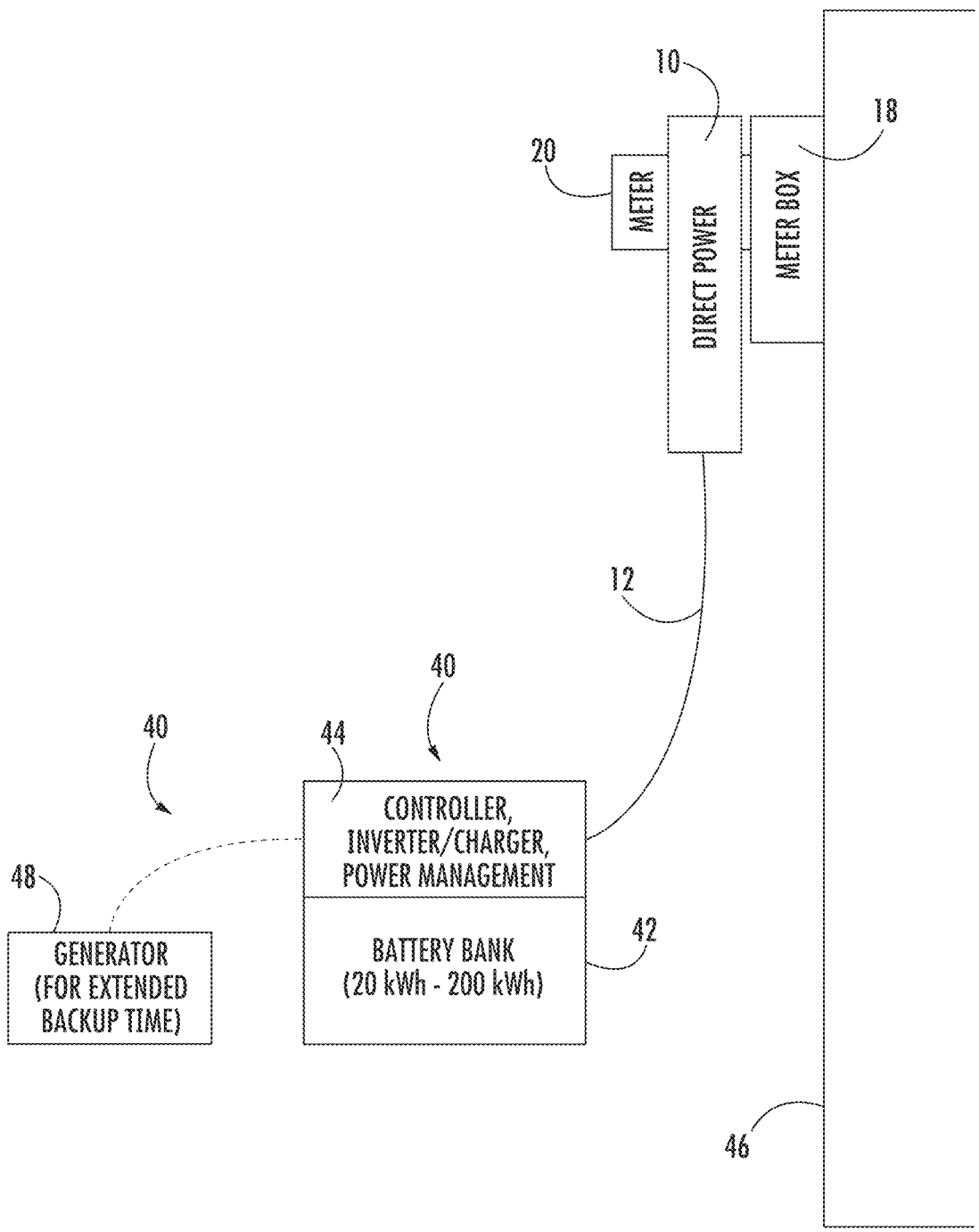
FIG. 4 is a schematic illustration of a standby power source in accordance with an embodiment of the present disclosure.

FIG. 4 illustrates an exemplary embodiment in accordance with the present disclosure in which the standby generator 13 shown in FIG. 1 is replaced by an alternate standby power source 40. The standby power source 40 replaces the generator 13 and is connected to the meter socket adapter 10 by the same cable 12 shown in FIG. 1. In the embodiment illustrated, the standby power source 40 includes a battery bank 42 and control module 44. The battery bank 42 and control module 44 replace the standby generator and provides a source of electric power to operate the electric loads contained within the home or building 46. The battery bank 42 is illustrated as having a capacity of between 20 kWh and 200 kWh. However, the size and capacity of the battery bank 42 can vary outside of this range depending upon the power requirements for the home or business including the standby power source 40. In the embodiment shown in FIG. 4, a supplemental generator 48 could be connected to the control module 44 to provide additional standby power. The generator 48 could be either a standby generator, such as shown by reference numeral 13 in FIG. 1, or portable generator that is plugged into the control module 44 as will be described in greater detail below.

Figure 5:
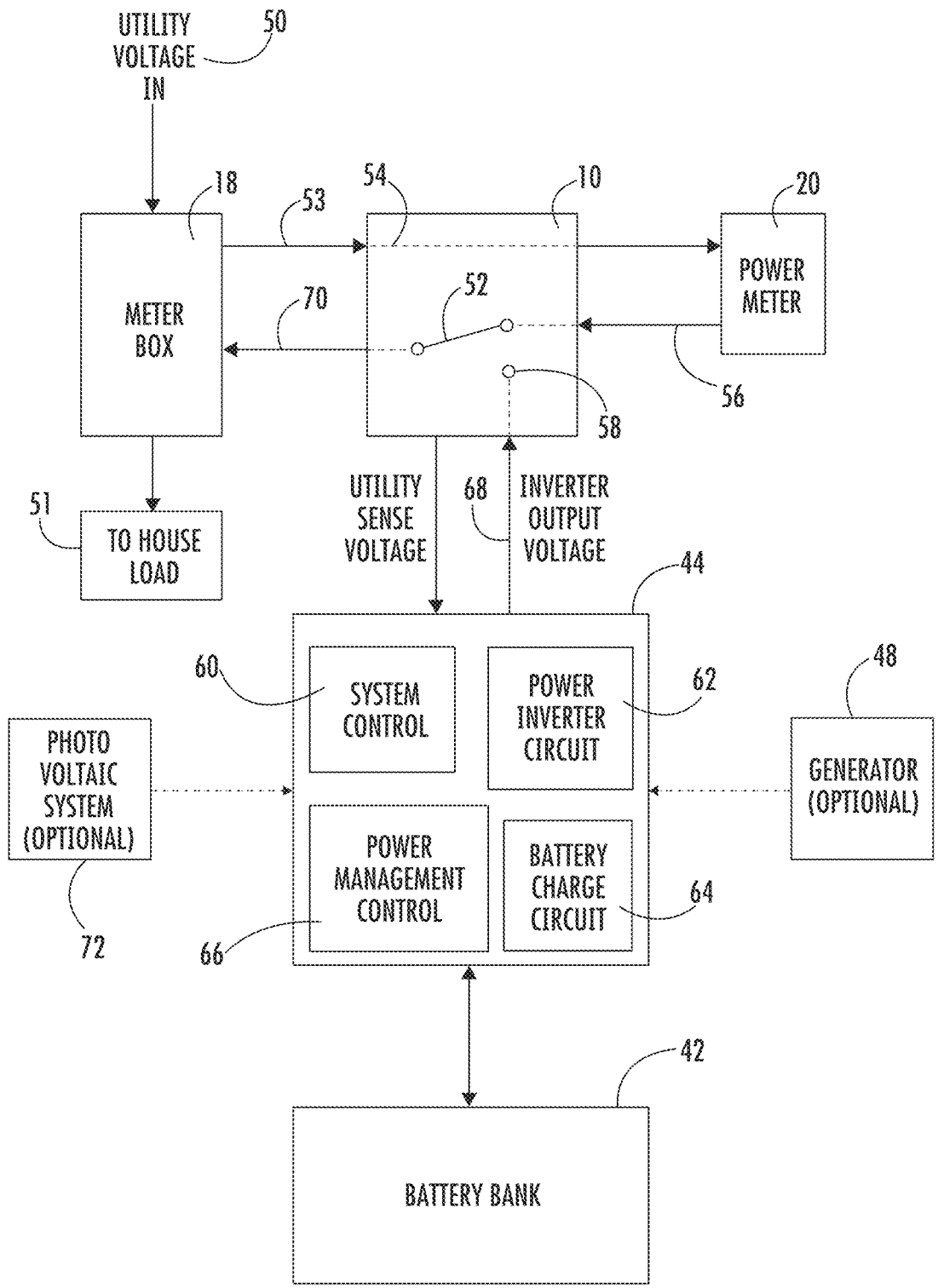
FIG. 5 is a block diagram illustrating the operational components of a standby power system in accordance with an embodiment of the present disclosure.

FIG. 5 provides a system diagram of a standby power source 40 constructed in accordance with the present disclosure. In the embodiment shown in FIG. 5, a supply of utility voltage 50 is received at the meter box 18 as is conventional. The utility power supply 50 may refer to electricity received from an electrical grid provided by a utility company. The meter box 18, in turn, is connected to a home or small business to power electric loads within the home, as shown by reference numeral 51. As described previously, the standby power source includes the meter socket adapter 10 that is directly connected to the meter box 18 through the inlet line 53. The meter socket adapter 10 includes a transfer switch 52 that is movable between first and second positions as will be described below. As shown in FIG. 5, a direct connection 54 allows power from the meter box 18 to travel through the meter 20. The opposite power connection 56 from the meter 20 flows through the transfer switch 52 and back to the meter box 18 when the transfer switch 52 is in the position shown in FIG. 5. The position of the transfer switch 52 in FIG. 5 is the position when utility power is present or when the system desires to have the utility power drive the loads 51 contained within the house. The power from the utility flows through the meter box 18 and to the loads 51 in the home.

If the transfer switch 52 is moved to a second position in which the switch is in contact with the secondary internal terminal 58, the power connection from the utility is interrupted such that the supply of power from the utility no longer flows through the power meter 20 and to the loads 51.

As shown in FIG. 5, the control module 44 includes a system controller 60, a power inverter circuit 62, a battery charging circuit 64 and a power management controller 66. Although each of these control circuits are shown within a common control module 44, it should be understood that one or more of the individual controls 60, 62, 64 or 66 could be either removed from the control module 44 and located elsewhere in the system or eliminated. The operation of each of the separate controls will be described in greater detail below.

In the embodiment shown in FIG. 5, a battery bank 42 is connected to the control module 44. The battery bank 42 preferably includes a series of individual batteries linked together either in a series or parallel configuration, or both. In one embodiment of the present disclosure, the battery bank 42 is a 96 kWh battery pack which is able to power the electric loads 51 within a home for between 8-12 hours of full operation. The individual batteries within the battery bank 42 can be various types of batteries, such as but not limited to lithium ion battery packs. Further, it is contemplated that the number and size of the individual batteries that make up the battery bank 42 could be initially selected or later modified by the homeowner depending upon the back-up power needs for the home. As an illustrative example, if the homeowner decides that the current size of the battery bank 42 is not sufficient for the home or if the power demands of the home have changed since installation, the homeowner can add additional batteries to the battery bank 42 to increase both the output power and the standby supply time.

The control module 44 includes a power inverter circuit 62 that is able to convert the DC output voltage from the battery bank 42 to an AC output. The AC output from the power inverter circuit 62 is supplied to the terminal 58 in the meter socket adapter 10 through the output line 68. When the transfer switch 52 is switched to the secondary position and is thus in contact with the terminal 58, the inverter output voltage on line 68 is supplied to the meter box through the output line 70. The secondary power supplied from the battery bank 42 is then directed to the house loads 51 such that the house loads 51 can be run from the stored power supply from the battery bank 42. The system controller 60 is used to monitor the charge on the battery bank 42 and control operating parameters of the power inverter circuit 62 in a well-known, conventional manner.

When the utility power supply is interrupted or absent, stored electric power from the battery bank 42 is supplied to power the house loads 51 as discussed above. However, it should be understood that the supply of electric power from the battery bank 42 is limited. Thus, after the utility power supply returns, the transfer switch 52 is moved back to the position shown in FIG. 5 such that utility power is supplied to the house loads 51.

At this time, the battery charging circuit 64 determines the stored charge on the battery bank 42 and functions to recharge the series of batteries contained within the battery bank 42. The battery charging circuit 64 can typically utilize the utility power supply 50 to recharge the battery bank 42. The system shown in FIG. 5 can also include other alternate charging sources. In the embodiment shown in FIG. 5, a photovoltaic system 72 is connected to the control module 44 such that the battery charging circuit 64 can utilize the photovoltaic system 72 to recharge the battery bank 42. As described previously, the system can also include a generator 48 that can either supplement the power supplied from the battery bank 42 or can be used to recharge the battery bank 42 as desired. The generator 48 can be a standby generator or a gas-powered backup generator depending upon the requirements of the homeowner. The generator 48 can be operated by the homeowner to either recharge the battery bank 42 when the utility power supply is no longer present or can be utilized to provide power directly to the house loads 51 in combination with the battery bank 42. The use of a generator 48 allows for the secondary power source 40 shown in the present disclosure to provide power to the house loads 51 for an extended period of time should the utility power supply 50 be interrupted for a period longer than can be supplied by the battery bank 42.

The control module 44 further includes a power management controller 66. The power management controller 66 can be included either in the control module 44 or within the meter socket adapter 10. In each case, the power management controller 66 can send signals to load management modules that are associated with high power consuming loads within the home. In this manner, the power management controller 66 can selectively shed high power consuming loads either when the battery bank 42 is becoming depleted or as desired to extend the time at which the battery bank 42 can power the house loads 51. In this manner, the control module 44 is able to shed loads as desired to extend the period of time that the battery bank 42 can supply and power the house loads 51.

As described above, the battery bank 42 can be used to supply power to house loads 51 during times in which the utility power supply 50 is not available, such as during storms, power outages or at other times when the utility power supply is interrupted. In addition, the battery bank 42 can be utilized at other times that are controlled either by the homeowner or by the utility. As an illustrative example, during times at which the demand for power faced by the utility is high, the utility can send control signals out to the control module 44 that cause the transfer switch 52 to switch to the secondary power supply from the battery bank 42. In this manner, the utility can increase capacity by utilizing the stored power on the battery banks 42 of individual homeowners. Such control could be utilized to avoid brown outs.

In another contemplated embodiment, the battery bank 42 can be connected to the house loads 51 during times at which energy is at the peak cost. In this manner, the homeowner would be able to reduce power consumption from the utility at times when the cost of power from the utility is at a peak value. Switching would not only reduce the power consumption for the homeowner but would also be a benefit to the utility by reducing peak loads.

Figure 6:
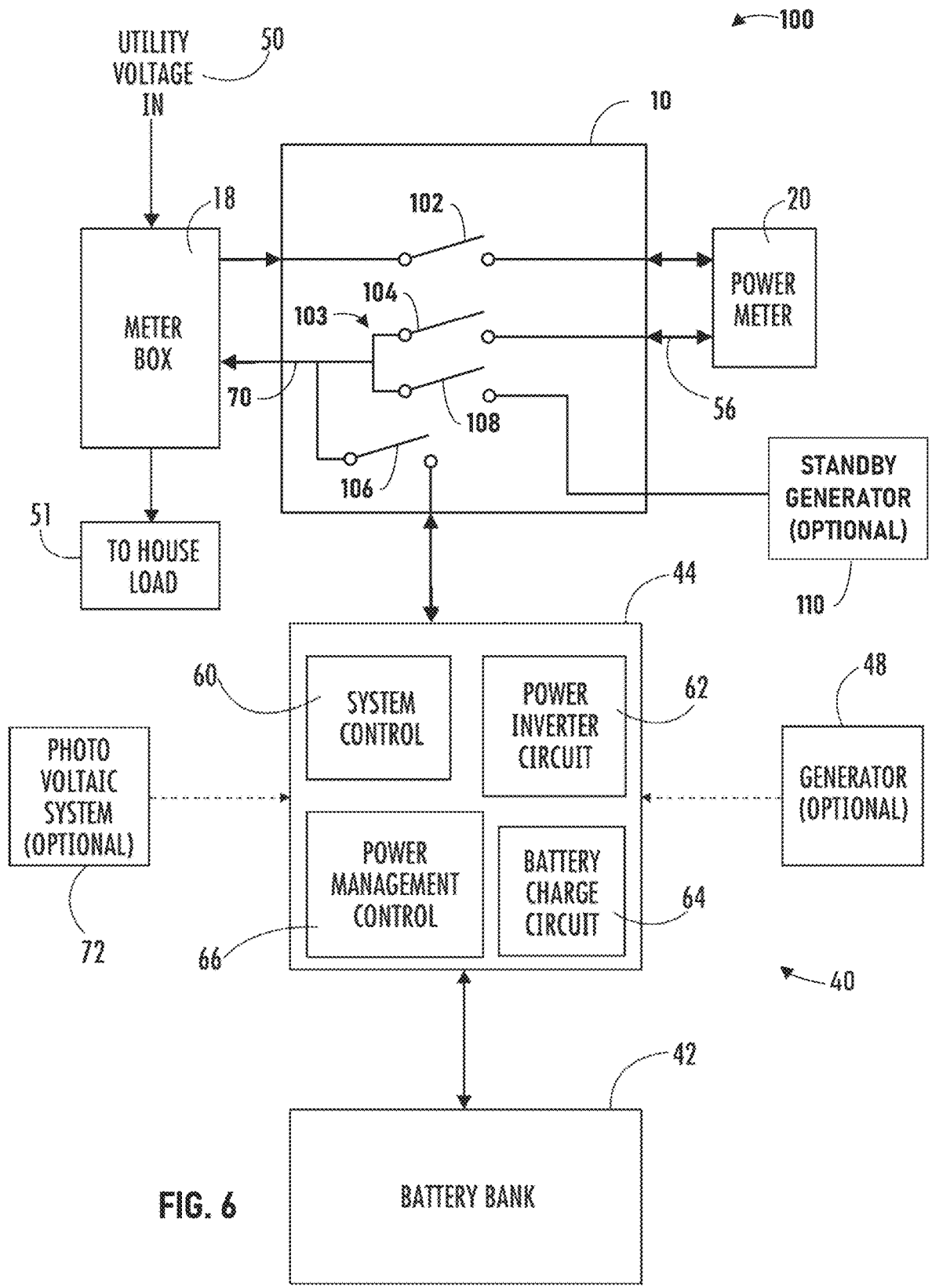
FIG. 6 is a block diagram illustrating the operational components of a standby power system in accordance with an embodiment of the present disclosure.

FIG. 6 provides a diagram of a system 100 in accordance with an exemplary embodiment with a standby power source 40. The system 100 is similar to the system of FIG. 5 with the exception of the different features shown in the diagram and described herein. System 100 includes a shutoff switch 102, which allows emergency responders (e.g. firefighters, police, etc.) to cut utility power to the house. The shutoff switch 102 may be used, for example, to cut power to the house load 51 when a gas leak is detected in the house in order to prevent fires. The shutoff switch 102 is intended to remain closed during the normal operation of the system 100.

Rather than a single transfer switch 52, system 100 includes a first or utility switch 104 and a second or standby power switch 106. The utility switch 104 may close or open to connect or disconnect the utility power supply 50 to or from the house load 51. The standby power switch 106 may close or open to connect or disconnect the standby power source 40 to or from the house load 51. System 100 may optionally include an additional standby generator 110. Generator switch 108 may close or open to connect or disconnect the standby generator 110 to or from the house load 51. The standby generator may be, for example, a gas-powered generator, and may be used when the utility power supply 50 is unavailable and the standby power source 40 has no power available (e.g., when battery bank 42 has no remaining charge).

The arrangement of the system 100 provides for several configurations depending on the particular power use situation. In a first configuration, the utility switch 104 and the standby power switch 106 are both closed. In one situation the utility power supply 50 provides power to the house load 51 and also to the battery bank 42 via control module 44. The battery bank 42 may then be charged by the utility power supply 50. This may be useful to charge the battery bank 42 when the standby power source 40 does not include a photovoltaic system 72 or a generator 48, or if either are not available, for example, if no sunlight is available for the photovoltaic system 72 or if the generator 48 is out of fuel or fuel prices for the generator 48 are more expensive than from the utility power supply 50. In another situation, the battery bank 42 may be selectively charged by the utility power supply 50 (e.g. by closing the standby power switch 106) during off-peak hours, when electrical power from the grid is typically less expensive.

In a second situation, the first and second switches 104, 106 are both closed so that the standby power source 40 and the utility power supply 50 may supply power to the house load 51. For example, the standby power source 40 may provide half of the power needed by the house load 51 and the utility power supply 50 may supply the other half. This may be useful when power from the utility power supply 50 is more expensive than the power available from the standby power source 40, but the standby power source 40 does not have sufficient capacity to power the whole house for an extended period of time. The standby power source 40 may provide its maximum amount of power and the utility power supply 50 may supply the remainder needed by the house load 51. Power supplied from the standby power source 40 may come from the battery bank 42 or may come directly from the photovoltaic system 72. For example, if the battery bank 42 is fully charged, power from the photovoltaic system may be delivered directly to the house load 51 rather than to the battery bank 42.

In a third situation, the first and second switches 104, 106 are also both closed. Power may be provided to the house load 51 from either the standby power source 40 or the utility power supply 50. The standby power source 40 may also provide power back to the grid. This may be useful when power from the utility power supply is expensive and the house load 51 is low. Power from the battery bank 42 or from the photovoltaic system 72 may be sold back to the electric company for payment or to receive a credit on the homeowner's electric bill. For example, the photovoltaic system 72 may produce more power than the house load 51 requires. The house load 51 may be powered entirely by the photovoltaic system 72 and the excess power can be fed back to the grid. In another example, the house load 51 may be powered entirely by the battery bank 42 and the battery bank 42 may feed additional power back to the grid. The battery bank 42 may have been charged at off-peak hours when electrical power from the grid was less expensive, and may feed power back to the grid at peak hours when electricity is more expensive. Thus the homeowner can essentially purchase less expensive electricity from the grid to charge the battery bank 42 and then sell the electricity back to the grid when electricity is more expensive.

In another configuration, the standby power switch 106 is closed while the utility switch 104 is open. In the situation where the utility power supply 50 is unavailable (e.g. during a power outage), the house load may be powered only by the standby power source 40. The utility switch 104 may be opened to prevent the standby power source 40 from feeding power back to the grid. This allows all of the power from standby power source 40 to be fed only to the house load 51 so that all of the power stored by the battery bank 42 or generated by the generator 48 or the photovoltaic system 72 can be used by the homeowner.

In another configuration, the standby power switch 106 is open while the utility switch 104 is closed. The house load 51 may be powered only by the utility power supply 50. The standby power source 40 may be disconnected from both the house load 51 and the utility power supply 50. For example, in a situation where the battery bank 42 is fully or near fully discharged, the standby power switch 106 may open to disconnect the standby power source 40. The battery bank 42 may then be charged by the photovoltaic system 72 or the generator 48. This may be useful when power from the utility power supply is expensive, but power from the photovoltaic system 72 is available.

In some embodiments, the transfer switch controller or another controller within meter socket adapter 10 may be configured to receive inputs and automatically control the positions of the switches 102, 104, 108, 106 based on the inputs. The inputs may include, for example, the price of fuel, the price of utility power from the utility power supply 50, the availability of utility power, the level of charge of the battery bank 42, the remaining fuel in the generator 48 or the standby generator 110, user preferences for using stored battery charge when available or conserving charge for utility power outages, user preferences for using green energy from the photovoltaic system 72. For example, if the controller determines that the cost of utility power falls below a predetermined threshold, the controller can close switches 104 and 106 such that the battery bank 42 may be charged by the utility power supply 50. If the controller determines that the cost of utility power exceeds a second predetermined threshold, the controller can open switch 104 and can power the house load 51 via the standby power source 40.

Figure 7:
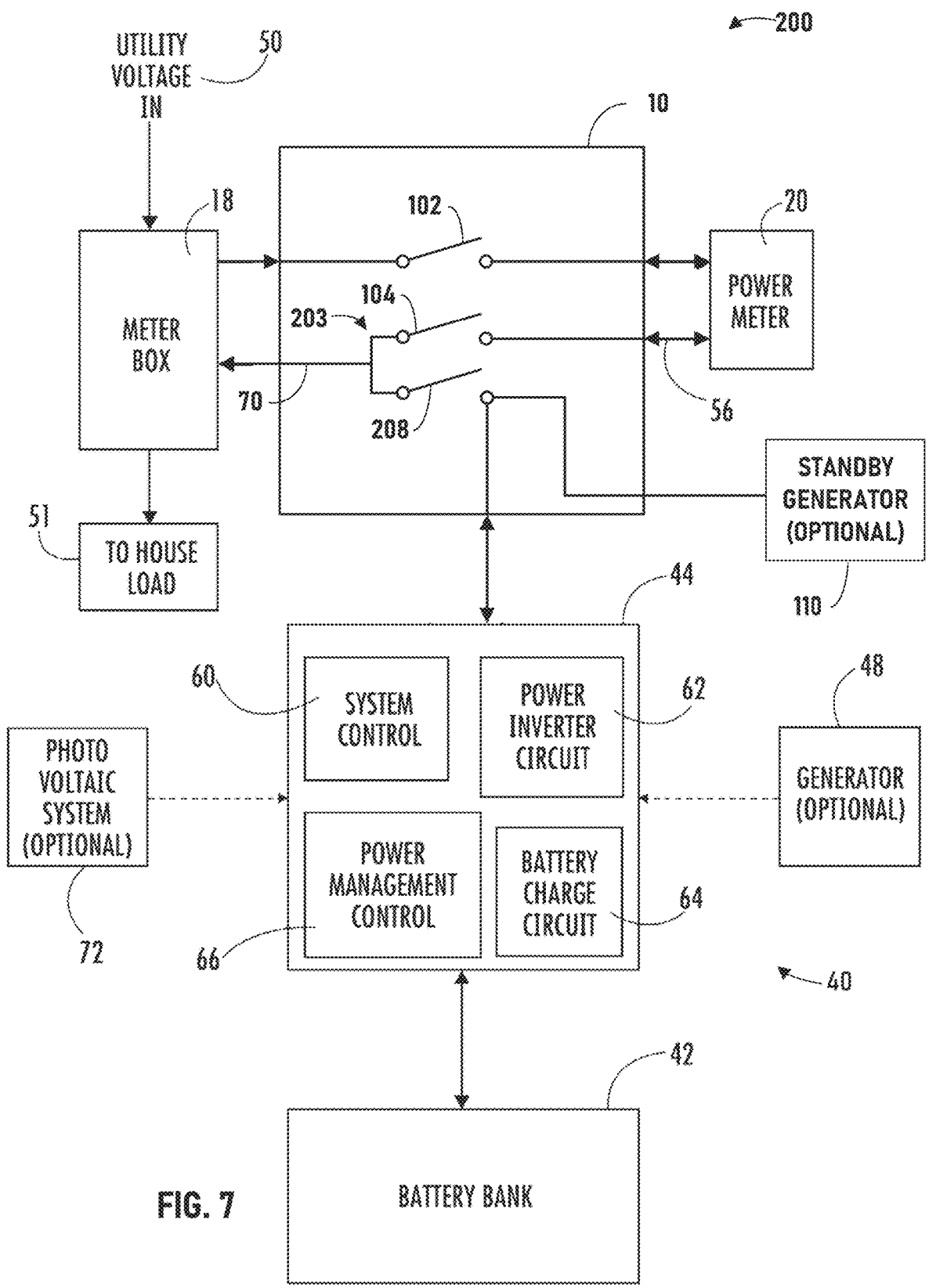
FIG. 7 is a block diagram illustrating the operational components of a standby power system in accordance with an embodiment of the present disclosure.

The utility switch 104 and the generator switch 108 cooperatively form transfer switch 103. Transfer switch 103 may be configured such that the utility switch 104 and the generator switch 108 cannot be closed at the same time. This would prevent the house load 51 from being connected to both the utility power supply 50 and the standby generator 110 at the same time. The logic sequence controlling the switching of the house load 51 from receiving power from the utility power supply 50 to receiving power from the standby generator 110 is shown in FIGS. 8-16. During an emergency, the shutoff switch 102 may be opened to disconnect the house load from the utility power supply 50. Opening the shutoff switch 102 may also cause the standby power switch 106 and the generator switch 108 to open. With shutoff switch 102, standby power switch 106, and generator switch 108 open, no power can reach the house load 51. In some embodiments, the transfer switch 103 may be set such that the generator switch 108 is closed and the utility switch 104 is open. An emergency stop on the standby generator 110 may be engaged to prevent the generator from supplying power. With shutoff switch 102 and standby power switch 106 open and the emergency stop engaged, no power can reach the house load 51. In some embodiments, the shutoff switch 102 is located between the meter box 18 and the house load 61, and opening the shutoff switch 102 prevents power from any source from reaching the house load 51. FIG. 7 provides a diagram of a system 200 in accordance with an exemplary embodiment with a standby power source 40. The system 200 is substantially similar to system 100 with the exception of the different features shown in the diagram and described herein. System 200 does not include a separate standby power switch 106. Instead, a backup power switch 208 may be configured to connect and disconnect the standby power source and, optionally, the standby generator. Utility switch 104 and standby power switch 208 cooperatively form a transfer switch 203. Transfer switch 203 may operate similarly to transfer switch 103. For example, transfer switch 203 may prevent both the utility power supply 50 and the standby power source 40 (or the standby generator 110) from supplying power to the house load 51 simultaneously. The standby power switch 208 and the generator switch 108 may collectively be referred to as secondary power switches.

Figure 8:
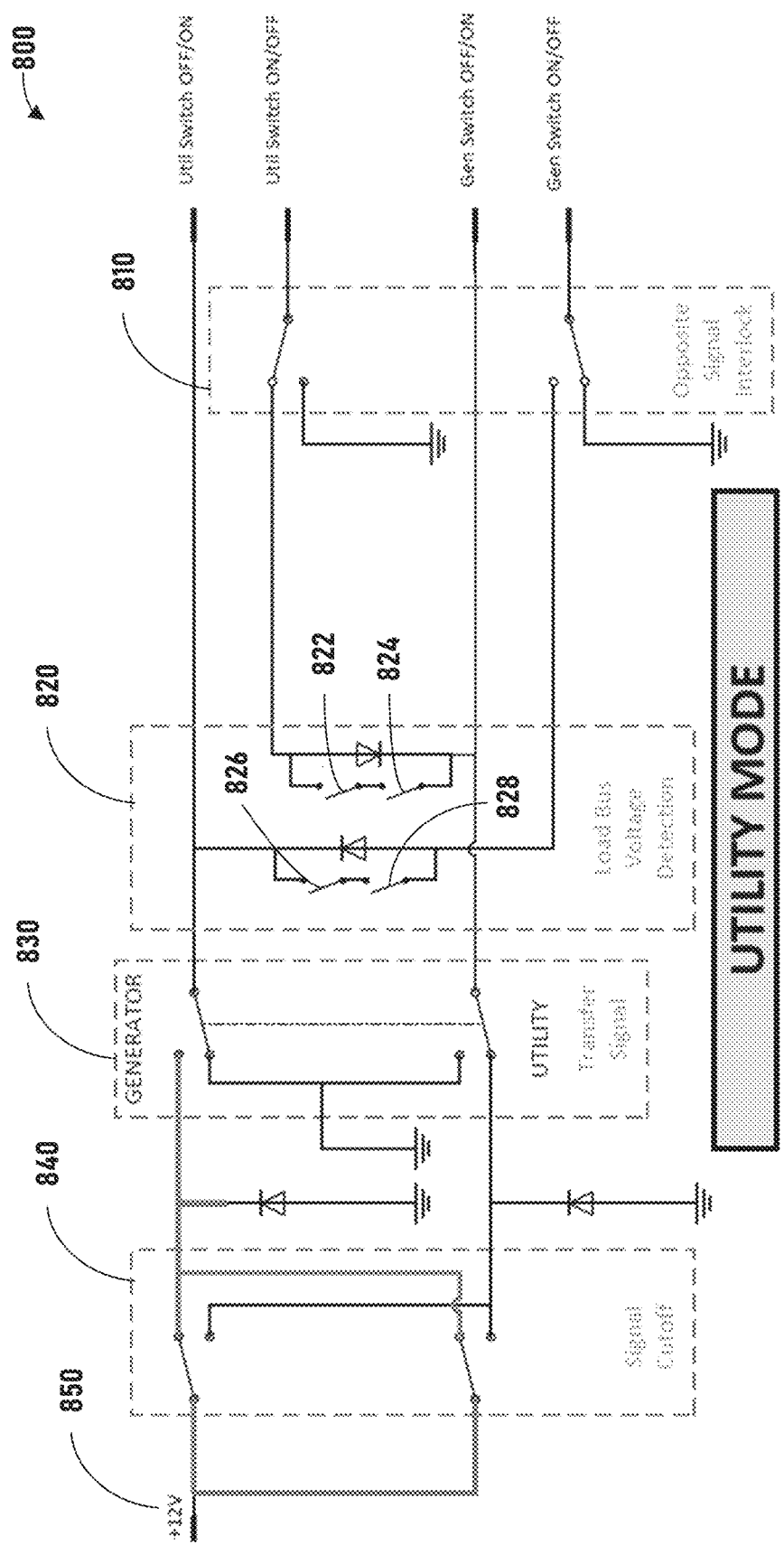
FIG. 8 shows a schematic diagram of transfer switch control logic in utility mode, according to an exemplary embodiment.

FIGS. 8-13 illustrate a control logic process that prevents the one power source from connecting to the house load 51 until the other power source has been disconnected. FIG. 8 shows a schematic diagram of transfer switch control logic 800 in utility mode, i.e., when the house load 51 is being powered by the utility power supply 50. Transfer switch control logic 800 may be implemented by a control circuit within the transfer switch controller of the meter socket adapter 10 or another controller within the meter socket adapter 10. The control circuit may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control circuit may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, relays, and so on). The control circuit may also include programmable hardware devices such as field programmable gate arrays, programmable array logic, programmable logic devices or the like. The control circuit may include one or more memory devices for storing instructions that are executable by the processor(s) of the controller. The controller may determine whether various relay contacts are open or closed and may send signals causing various relay contacts to open or close based on the transfer switch control logic 800. Relay contacts may be provided as the sole contact in a relay or as one of multiple contacts in a relay.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device may be communicably connected to the processor to provide computer code or instructions to the processor for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein.

The transfer switch control logic 800 as implemented by the controller controls the operation of the transfer switch 103, 203 so as to prevent multiple power sources from simultaneously reaching the house load 51. Transfer switch control logic 800 includes an interlock module 810, a load bus voltage detection module 820, a transfer signal module 830, a signal cutoff module 840, and a signal voltage source 850. The signal voltage source 850 may send a signal to close the utility switch 104 or the generator switch 108 when the appropriate relay contacts are positioned to transmit the signal. The load bus voltage detection module 820 includes four detection relay contacts 822, 824, 826, 828 that remain open and prevent a signal voltage from traveling therethrough when a voltage is detected from the utility power supply 50 or a backup power source (e.g., the standby generator 110, the standby power source 40). In some embodiments, the relay contacts are provided as two relays each with two sets of contacts (e.g., contacts 822 and 826 are provided in a double pole double throw relay and contacts 824 and 828 are provided in a second relay. In other embodiments, each relay contact is provided in its own relay for a total of four relays. While the system remains in utility mode, the switches in the signal cutoff module 840 remain in a blocked position such that the voltage from the signal voltage source 850 does not cause either of the switches 104, 108 to close or open.

Figure 9:
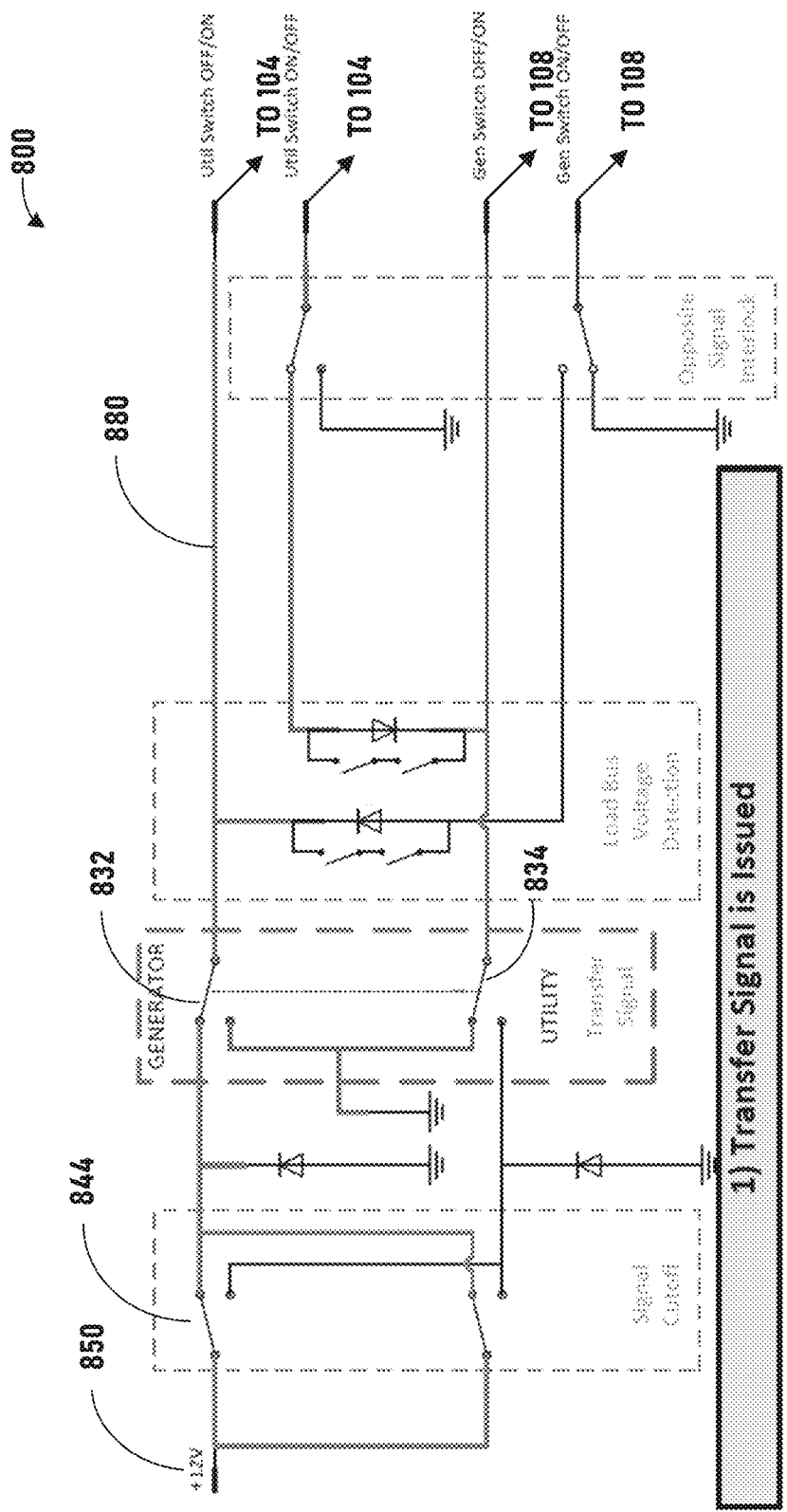
FIG. 9 shows a schematic diagram of transfer switch control logic after a transfer signal is issued, according to an exemplary embodiment.

Next, FIG. 9 shows a schematic diagram of transfer switch control logic 800 after a transfer signal has been received to switch the house load 51 to receiving power from the standby generator 110. The transfer signal may be, for example, a signal delivered by a manual switch on the meter socket adapter 10 or by a signal sent by the control module 44, the transfer switch controller, or some other controller coupled to the system. The controller may be configured to determine which power source to connect to the house load 51 based on various inputs. For example, if the controller detects no incoming power from the utility power supply 50, the controller can generate a transfer signal to switch the transfer switch 103, 203 from the utility power supply 50 to the backup power source. If the controller detects that the fuel level of the standby generator 110 or the battery charge of the battery bank 42 falls below a predetermined threshold and that there is incoming power from the utility power supply 50, the controller can generate a transfer signal to switch the transfer switch 103, 203 from the standby generator 110 or standby power source 40 to the utility power supply 50.

The controller may also receive cost inputs and may compare the costs of various power sources to determine whether to switch from the utility power supply 50 to the backup power source. For example, the controller may receive a rate schedule for power from the utility power supply 50 that includes higher rates during the day than at night. The controller may also receive an input indicating the cost of fuel for the standby generator 110 and may calculate a cost per kilowatt-hour generated. When the cost of power from the utility power supply 50 exceeds the cost of power from the standby generator 110, the controller can generate a transfer signal to switch the transfer switch 103, 203 from the utility power supply 50 to the standby generator. The controller may also receive inputs relating to user preferences. For example, a user may enter a green energy preference indicating that power from the photovoltaic system 72 should be used whenever it is available. If the controller detects that the battery bank has been charged by the photovoltaic system 72, the controller can generate a transfer signal to switch the transfer switch 103, 203 from the utility power supply 50 to the standby power supply 40. In another example, the controller may receive a preference for backup power when power from the utility power supply 50 exceeds an input cost. When the cost of power from the utility power supply 50 exceeds the input cost, the controller can generate a transfer signal to switch the transfer switch 103, 203 from the utility power supply 50 to the standby power supply 40.

When the transfer signal is received, the transfer relay contacts 832 and 834 in the transfer signal module switch from a utility position to generator position. A signal from the signal voltage source 850 can travel through the second signal cutoff relay contact 844, the transfer relay contact 832 and the connector 880 to the utility switch 104, causing the utility switch 104 to open and disconnecting the house load 51 from the utility power supply 50. In this configuration, the signal from the signal voltage source 850 would be able to reach the generator switch 108 if not for the relay contacts in the load bus voltage detection module 820

Figure 10:
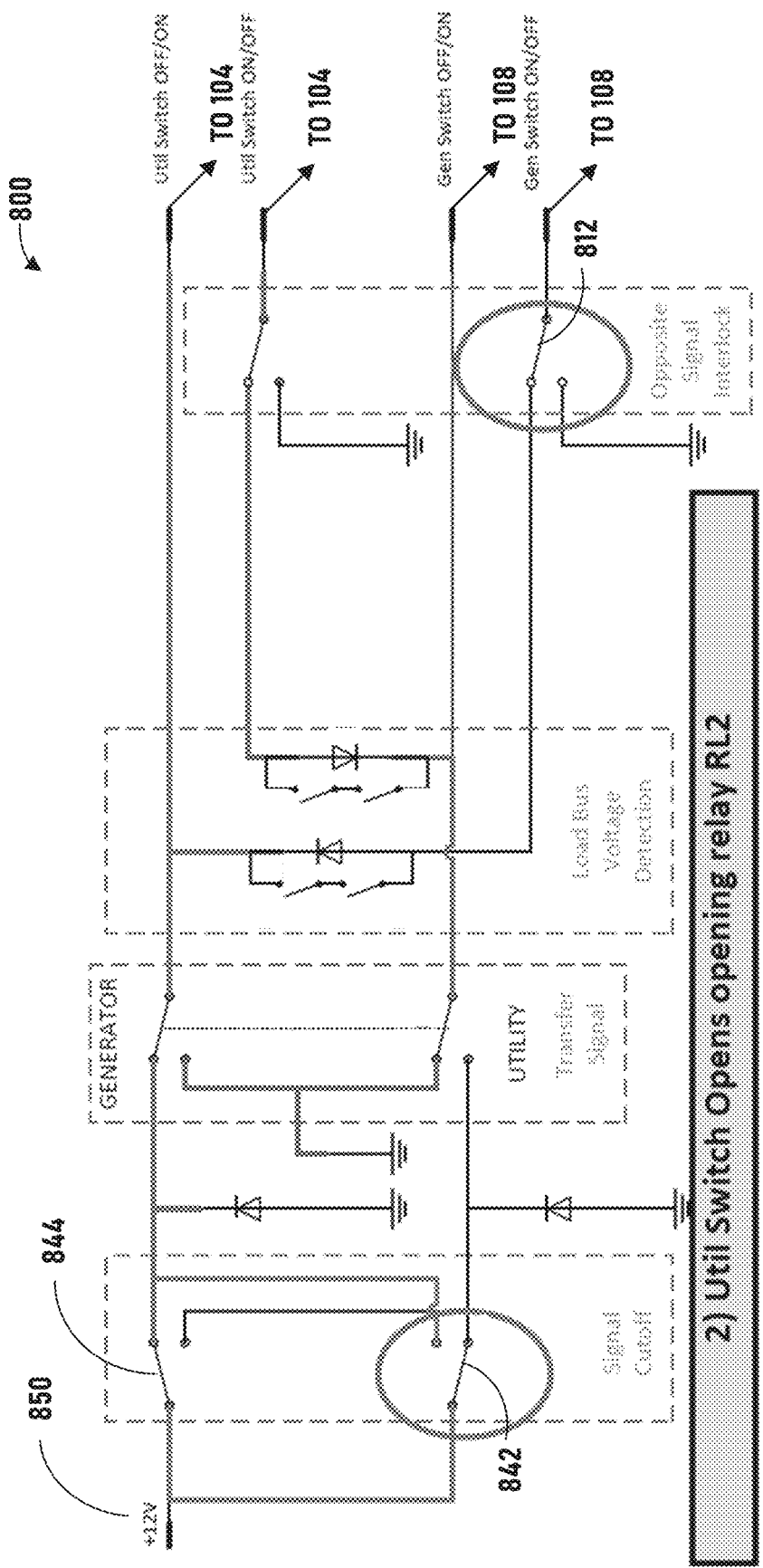
FIG. 10 shows a schematic diagram of transfer switch control logic after a utility switch opens, according to an exemplary embodiment.

Next, FIG. 10 shows a schematic diagram of transfer switch control logic 800 after the utility switch 104 opens. Opening of the utility switch 104 sends a signal causing the first interlock relay contact 812 and the first signal cutoff relay contact 842 to switch positions. The first interlock relay contact 812 changes to a generator mode position and the first signal cutoff relay contact 842 changes to a cutoff position. Because the second signal cutoff relay contact 844 is still in its original position, the signal from the signal voltage source 850 is still able to travel through the transfer signal module 830, but is still unable to travel through the open relay contacts in the load bus voltage detection module 820.

Figure 11:
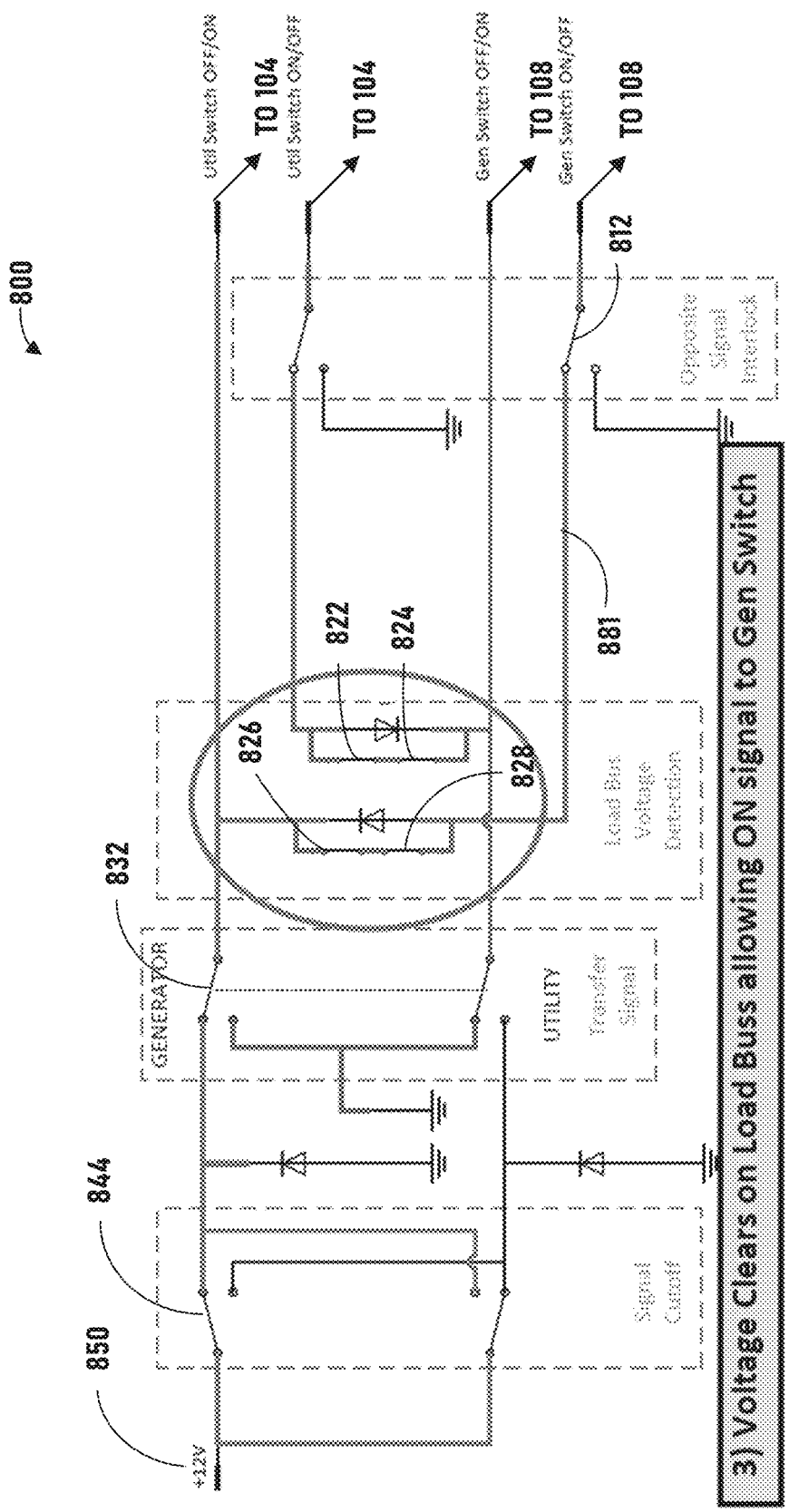
FIG. 11 shows a schematic diagram of transfer switch control logic after a voltage clears on a load bus, according to an exemplary embodiment.

Next, FIG. 11 shows a schematic diagram of transfer switch control logic 800 after the voltage is cut off to the load bus voltage detection module 820. The detection relay contacts 822, 824, 826, 828 close in response to the load bus detection module detecting no voltage. A signal from the signal voltage source 850 may then travel through the second signal cutoff relay contact 844, the transfer relay contact 832, the detection relay contacts 826, 828, the connector 881, and the first interlock relay contact 812, causing the generator switch 108 to close and connecting the house load 51 to the standby generator 110. The standby generator 110 may then supply power to the house load 51.

Figure 12:
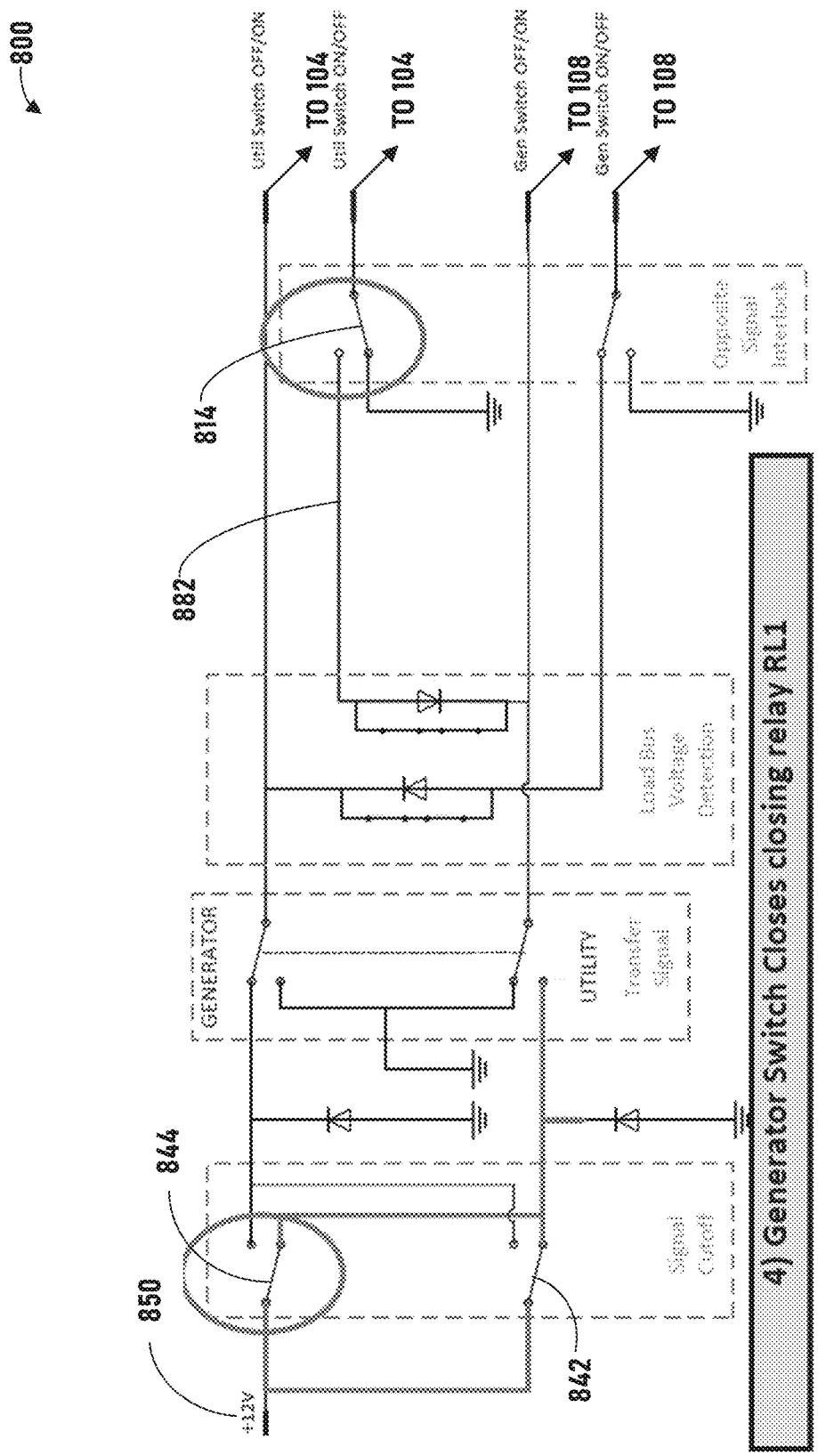
FIG. 12 shows a schematic diagram of transfer switch control logic after a generator switch closes, according to an exemplary embodiment.

Next, FIG. 12 shows a schematic diagram of transfer switch control logic 800 after the generator switch 108 closes. Closing of the generator switch 108 causes the second interlock relay contact 814 and the second signal cutoff relay contact 844 to switch positions. The second signal cutoff relay contact 844 switches to a position that, in combination with the position of the first signal cutoff relay contact 842, grounds the signal voltage source 850 such that a signal does not reach either of the switches 104, 108. The second interlock relay contact 814 switches to a position disconnecting the utility switch 104 from the connector 882 and the rest of the control logic circuit.

Figure 13:
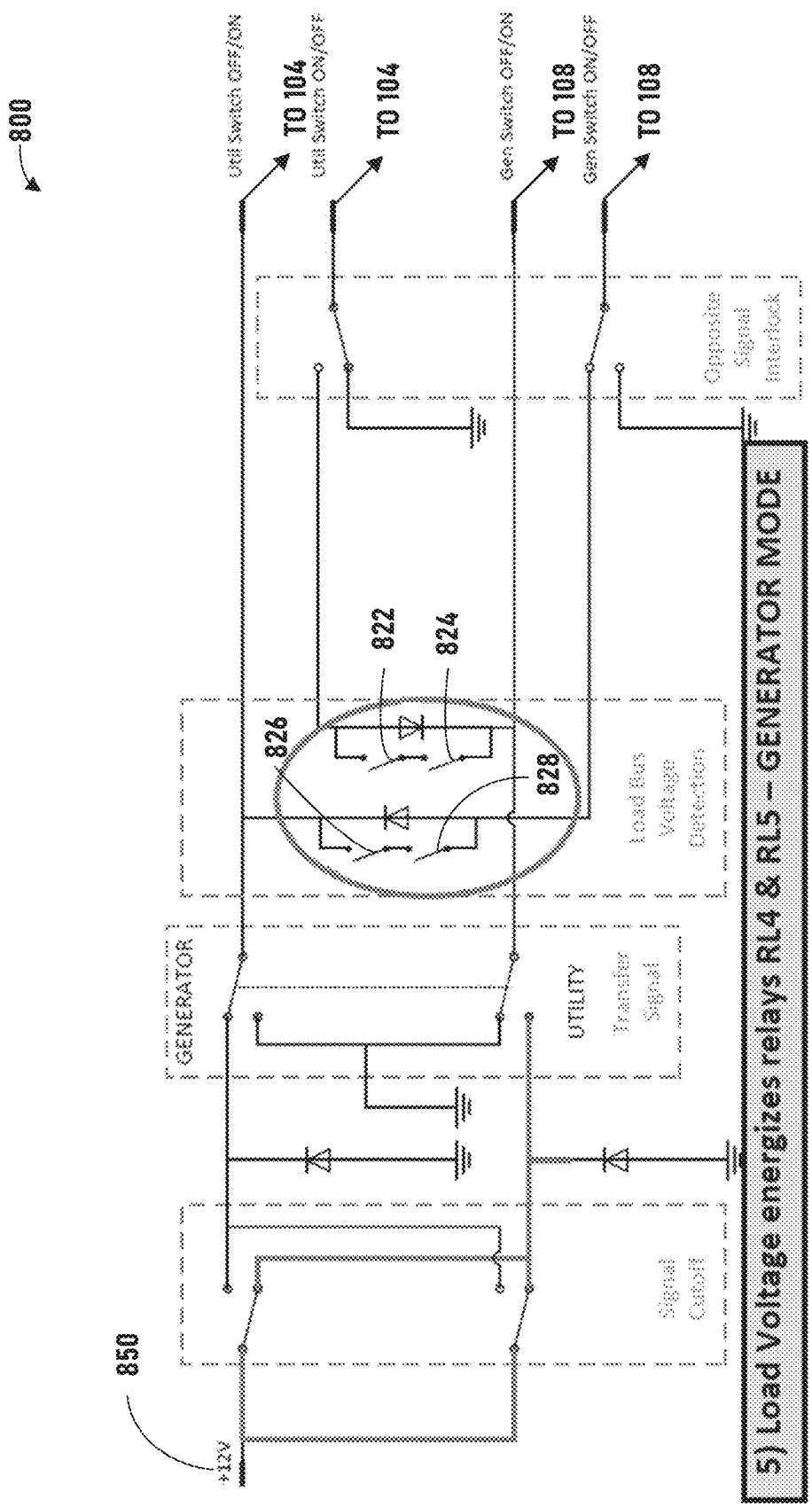
FIG. 13 shows a schematic diagram of transfer switch control logic after a voltage energizes the load bus, according to an exemplary embodiment.

Next, FIG. 13 shows a schematic diagram of transfer switch control logic 800 after power begins to flow from the generator to the house load 51. The power flowing to the house load 51 causes the detection relay contacts 822, 824, 826, 828 to detect a voltage, causing them to reopen. The relay contacts 822, 824, 826, 828 remain open while the voltage is present, thus preventing a signal from reaching the first switch 104. The house load 51 is now receiving power only from the standby generator 110. The transfer switch control logic 800, as shown in FIGS. 8-13, ensures that the standby generator 110 and the utility power supply 50 cannot be connected to the house load 51 at the same time by preventing either source from connecting until no voltage is detected in the load bus. In some embodiments, the transfer switch control logic 800 may be used to prevent additional power sources (e.g. standby power source 40) from connecting to the house load 51 at the same time as the utility power supply 50.

Figure 14:
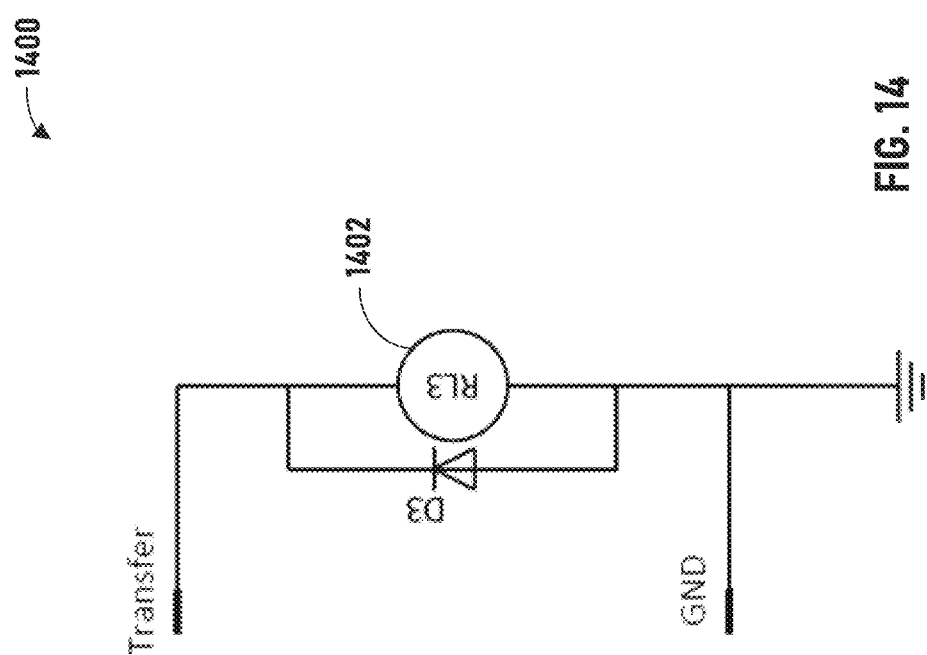
FIG. 14 shows a schematic diagram of a transfer signal detection circuit, according to an exemplary embodiment.

FIG. 14 shows a schematic diagram of a transfer signal detection circuit 1400. When a transfer signal is generated, for example, by a manual switch on the meter socket adapter 10 or by a signal sent by the control module 44 or some other controller coupled to the system, a transfer signal detector 1402 detects a voltage. The transfer signal detector may then cause the transfer relay contacts 832, 834 to change from a utility mode position to a generator mode position, as described in reference to FIG. 9.

Figure 15:
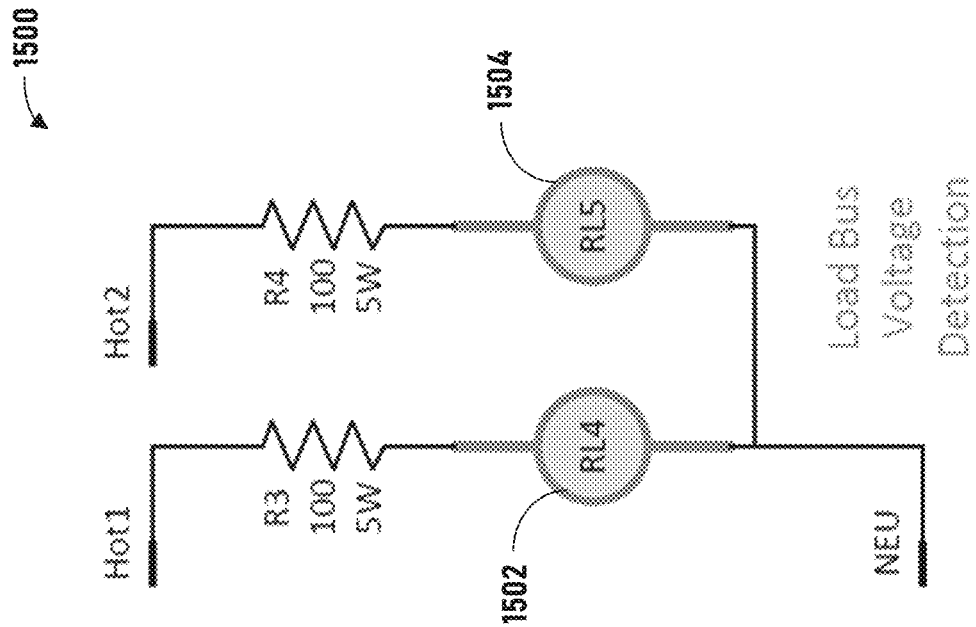
FIG. 15 shows a schematic diagram of a load bus detection circuit, according to an exemplary embodiment.

FIG. 15 shows a schematic diagram of a load bus detection circuit 1500. The load bus detection circuit includes two voltage detectors 1502 and 1504. When power being delivered to the house load 51 by either the utility power supply 50 or the standby generator 110, the voltage detectors 1502, 1504 may detect a voltage in the load bus, causing the detection relay contacts 822, 824, 826, 828 in the transfer switch control logic 800 to remain open, as described in reference to FIG. 8. When no voltage is detected by the voltage detectors 1502, 1504, the detection relay contacts 822, 824, 826, 828 are allowed to close, as described in reference to FIG. 11, allowing a signal to be sent to close the utility switch 104 or the generator switch 108 to connect the utility power supply 50 or the standby generator 110.

Figure 16:
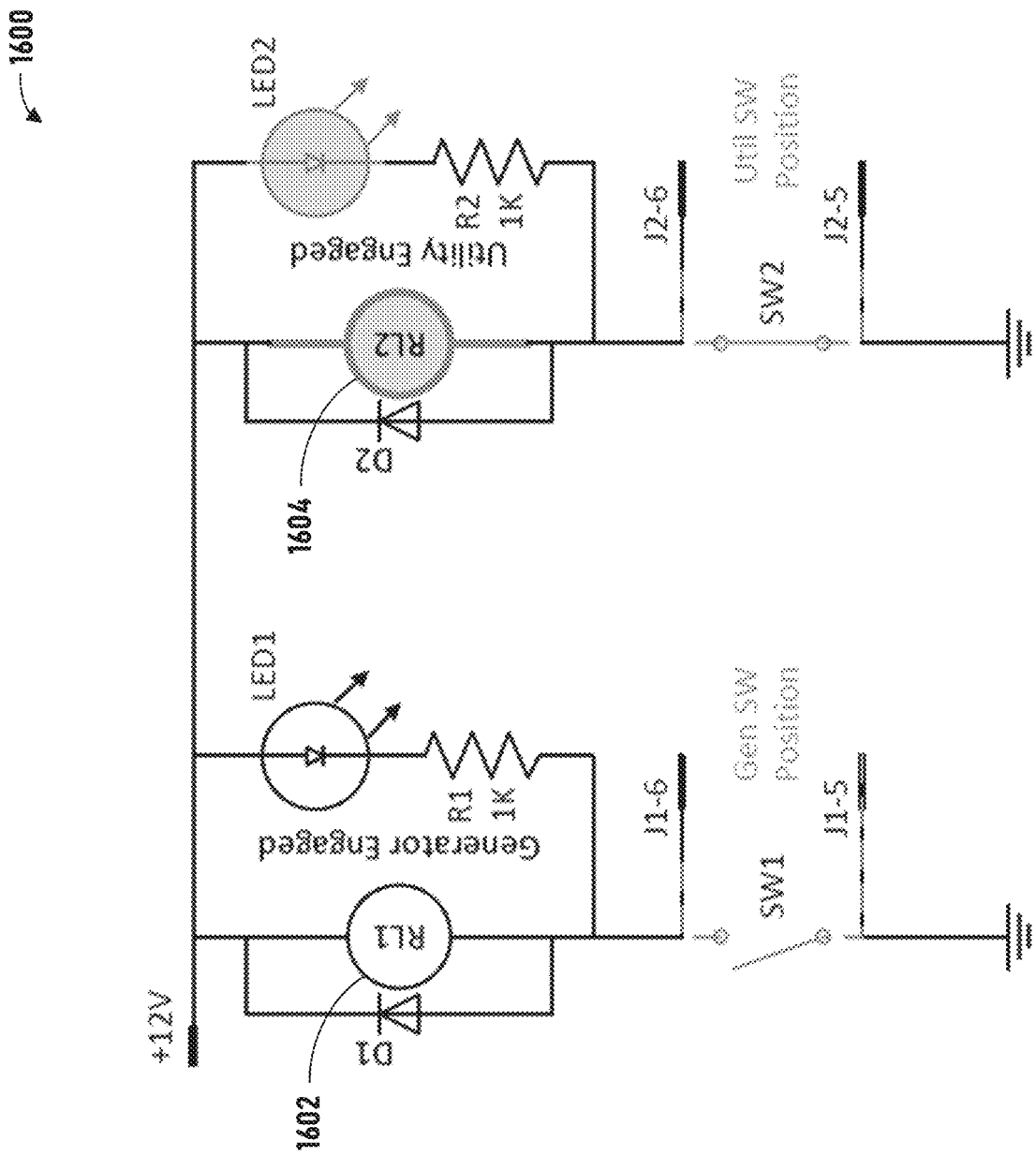
FIG. 16 shows a schematic diagram of a switch detection circuit, according to an exemplary embodiment.

FIG. 16 shows a schematic diagram of a switch detection circuit 1600, including a generator switch detector 1602 and a utility switch detector 1604. When the generator switch 108 is closed or opened the generator switch detector 1602 detects or stops detecting a voltage and causes the second interlock relay contact 814 and the second signal cutoff relay contact 844 to switch positions, as described in reference to FIG. 12. When the utility switch 104 is closed or opened the utility switch detector 1604 detects or stops detecting a voltage and causes the second interlock relay contact 814 and the second signal cutoff relay contact 844 to switch positions, as described in reference to FIG. 12.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical system operable to selectively supply power from a primary power source and a standby power source to one or more electrical loads, the electrical system configured to be provided between an electricity meter and a meter socket, comprising:
    a housing;
    a plurality of contacts configured to be coupled with the electricity meter and the meter socket;
    a transfer switch comprising:
        a first power source switch configured to selectively connect the primary power source to the one or more electrical loads in response to receiving a signal voltage; and
        a second power source switch configured to selectively connect the standby power source to the one or more electrical loads in response to receiving the signal voltage; and
    a controller configured to selectively control operation of the first power source switch and the second power source switch, the controller comprising a transfer switch logic circuit comprising:
        a transfer signal module configured to selectively connect the first power source switch and the second power source switch to the signal voltage in response to a first transfer signal; and
        a signal cutoff module comprising a first cutoff switch and a second cutoff switch arranged in parallel and each configured to connect the signal voltage to the first power source switch and the second power source switch via the transfer signal module, wherein, upon receiving the first transfer signal:
            the first cutoff switch is configured to cut off the transfer signal module from the signal voltage when the first power source switch disconnects the primary power source from the one or more electrical loads; and
            the second cutoff switch is configured to cut off the transfer signal module from the signal voltage when the second power source switch connects the standby power source to the one or more electrical loads.

2. The electrical system of claim 1, wherein the standby power source comprises a battery bank comprising one or more storage batteries and a control module connected to the transfer switch.

3. The electrical system of claim 1, wherein the standby power source further comprises a photovoltaic system configured to supply power to the one or more electrical loads.

4. The electrical system of claim 1, wherein the standby power source comprises one or more of a battery bank comprising one or more storage batteries or a standby generator.

5. The electrical system of claim 1, wherein the controller is configured to allow the second power source switch to connect the standby power source to the one or more electrical loads only when the primary power source is not connected to the one or more electrical loads by the first power source switch, and wherein the controller is configured to allow the first power source switch to connect the primary power source to the one or more electrical loads only when the standby power source is not connected to the one or more electrical loads by the second power source switch.

6. The electrical system of claim 1, further comprising a shutoff switch configured to disconnect the primary power source from the one or more electrical loads.

7. An electrical system operable to selectively supply power from a first power source, a second power source, and a third power source to one or more electrical loads, the electrical system configured to be provided between an electricity meter and a meter socket, comprising:
    a housing;
    a plurality of contacts configured to be coupled with the meter and the meter socket;
    a transfer switch comprising:

a first power source switch configured to selectively connect the first power source to the one or more electrical loads in response to receiving a signal voltage; and
a second power source switch configured to selectively connect the second power source to the one or more electrical loads in response to receiving the signal voltage;
a third power source switch configured to selectively connect the third power source to the one or more electrical loads; and
a controller configured to selectively control operation of the first power source switch, the second power source switch, and the third power source switch, the controller comprising a transfer switch logic circuit comprising:
 a transfer signal module configured to selectively connect the first power source switch and the second power source switch to the signal voltage in response to a first transfer signal; and
 a signal cutoff module comprising a first cutoff switch and a second cutoff switch arranged in parallel and each configured to connect the signal voltage to the first power source switch and the second power source switch via the transfer signal module, wherein, upon receiving the first transfer signal:
  the first cutoff switch is configured to cut off the transfer signal module from the signal voltage when the first power source switch disconnects the first power source from the one or more electrical loads; and
  the second cutoff switch is configured to cut off the transfer signal module from the signal voltage when the second power source switch connects the second power source to the one or more electrical loads.

8. The electrical system of claim 7, wherein the first power source comprises an electrical grid, the second power source comprises a standby generator, and the third power source comprises a battery bank comprising one or more storage batteries and a control module connected to the transfer switch.

9. The electrical system of claim 8, wherein the controller is configured to connect the first power source to the third power source by closing the first power source switch and the third power source switch, the controller further configured to selectively allow the third power source to supply power to and receive power from the first power source.

10. A meter socket adapter configured to allow switching between a utility power supply and a secondary power supply to provide power to an electrical load, the meter socket adapter configured to be mounted between an electricity meter and a meter housing, the meter socket adapter comprising:

a transfer switch comprising:
 a utility switch for selectively coupling the utility power supply to the electrical load in response to receiving a signal voltage; and
 a secondary power switch for selectively coupling the secondary power supply to the electrical load in response to receiving the signal voltage; and
a controller comprising a transfer switch logic circuit configured to selectively control operation of the transfer switch, the transfer switch logic circuit comprising:
 a transfer signal module configured to selectively connect the utility switch and the secondary power switch to the signal voltage in response to a first transfer signal; and
 a signal cutoff module comprising a first cutoff switch and a second cutoff switch arranged in parallel and each configured to connect the signal voltage to the utility switch and the secondary power switch via the transfer signal module, wherein, upon receiving the first transfer signal:
  the first cutoff switch is configured to cut off the transfer signal module from the signal voltage when the utility switch disconnects the utility power supply from the electrical load; and
  the second cutoff switch is configured to cut off the transfer signal module from the signal voltage when the secondary power switch connects the secondary power supply to the electrical load.

11. The meter socket adapter of claim 10, wherein the transfer switch logic circuit comprises a load bus detection module configured to allow the utility power supply or the secondary power supply to connect to the electrical load only when no voltage is detected in an output line connected to the electrical load.

12. The meter socket adapter of claim 11, wherein the load bus detection module comprises a plurality of relay contacts configured to prevent the signal voltage from reaching the utility switch and the secondary power switch when a voltage is detected from either of the utility power supply or the secondary power supply.

13. The meter socket adapter of claim 10, wherein the transfer signal module is configured to, in response to the first transfer signal, simultaneously disconnect a first relay contact from the signal cutoff module and connect a second relay contact to the signal cutoff module.

14. The meter socket adapter of claim 10, wherein the transfer switch logic circuit further comprises an opposite signal interlock module, the opposite signal interlock module configured to prevent the signal voltage from reaching the utility switch when the secondary power supply is connected to the electrical load and to prevent the signal voltage from reaching the secondary power switch when the utility power supply is connected to the electrical load.

* * * * *